US008976256B2

(12) United States Patent
Hoelscher et al.

(10) Patent No.: US 8,976,256 B2
(45) Date of Patent: Mar. 10, 2015

(54) REMOTE SENSING OF HIDDEN OBJECTS

(75) Inventors: Mark G. Hoelscher, Dayton, OH (US); Michael A. Marciniak, Riverside, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 268 days.

(21) Appl. No.: 13/368,498

(22) Filed: Feb. 8, 2012

(65) Prior Publication Data

US 2012/0242854 A1    Sep. 27, 2012

Related U.S. Application Data

(60) Provisional application No. 61/454,728, filed on Mar. 21, 2011.

(51) Int. Cl.
*H04N 5/225* (2006.01)
*H04N 5/262* (2006.01)

(52) U.S. Cl.
CPC ............................. *H04N 5/2628* (2013.01)
USPC ...................................... 348/222.1; 348/370

(58) Field of Classification Search
None
See application file for complete search history.

(56) References Cited

U.S. PATENT DOCUMENTS

| | | | |
|---|---|---|---|
| 7,794,090 B2 | 9/2010 | Tan et al. | |
| 2007/0171381 A1* | 7/2007 | Tan et al. | 353/69 |
| 2007/0171382 A1* | 7/2007 | Tan et al. | 353/69 |
| 2007/0217772 A1* | 9/2007 | Lemelson | 396/4 |
| 2008/0123937 A1* | 5/2008 | Arias Estrada et al. | 382/154 |
| 2008/0174516 A1* | 7/2008 | Xiao et al. | 345/1.3 |
| 2009/0244090 A1* | 10/2009 | Zhang et al. | 345/619 |
| 2009/0245690 A1* | 10/2009 | Li et al. | 382/285 |
| 2010/0123784 A1* | 5/2010 | Ding et al. | 348/189 |
| 2010/0328677 A1* | 12/2010 | Debevec et al. | 356/600 |
| 2011/0025929 A1* | 2/2011 | Wu et al. | 348/745 |
| 2011/0304745 A1* | 12/2011 | Wang et al. | 348/229.1 |

OTHER PUBLICATIONS

Fildes, Jonathan, "Laser camera takes photos around corners," BBC News, Nov. 18, 2010, http://www.bbc.co.uk/news/technology-11544037 (Last accessed Jan. 10, 2012).
Sen et al., "Dual Photography," ACM Transactions on Graphics, vol. 24, No. 3, Jul. 2005, (Proceedings of ACM SIGGRAPH 2005).

* cited by examiner

*Primary Examiner* — Twyler Haskins
*Assistant Examiner* — Dwight C Tejano
(74) *Attorney, Agent, or Firm* — AFMCLO/JAZ; Charles Figer, Jr.

(57) ABSTRACT

An apparatus and method are provided for creating an indirect image of an object. The apparatus includes a light source and an imaging system. Light emitted from the light source is reflected by a first non-specular surface toward the object. Light reflected by the object is further reflected by a second non-specular surface toward the imaging system. The imaging system is configured to create the indirect image from the reflected light.

16 Claims, 13 Drawing Sheets

|     | Mask |       |       |       |       |       |       |       |       |
| --- | ---  | ---   | ---   | ---   | ---   | ---   | ---   | ---   | ---   |
| Res | Ace  | 2     | 3     | 4     | 5     | 6     | 7L    | 7U    | 8     |
| 5x3 | 0.016 | 0.001 | 0.007 | 0.026 | 0.027 | 0.015 | 0.011 | 0.012 | 0.009 |
| 11x7 | 0.021 | 0.012 | 0.016 | 0.032 | 0.034 | 0.016 | 0.012 | 0.013 | 0.014 |

Table 6. Five of clubs indirect image quality

*Fig. 17*

|      | Mask |        |        |        |        |        |        |        |        |
| ---  | ---  | ---    | ---    | ---    | ---    | ---    | ---    | ---    | ---    |
| Card | Ace  | 2      | 3      | 4      | 5      | 6      | 7L     | 7U     | 8      |
| Ace  | 0.032 | -0.005 | 0.008  | -0.004 | 0.004  | -0.002 | -0.002 | -0.002 | -0.002 |
| 2    | -0.009 | 0.032 | 0.019 | 0.003 | 0.0002 | -0.003 | -0.004 | -0.003 | -0.005 |
| 3    | 0.022 | 0.024 | 0.026 | -0.001 | 0.005 | -0.003 | -0.005 | -0.005 | -0.007 |
| 4    | -0.015 | 0.004 | -0.003 | 0.032 | 0.024 | 0.018 | 0.014 | 0.015 | 0.011 |
| 5    | 0.016 | 0.001 | 0.007 | 0.026 | 0.027 | 0.015 | 0.011 | 0.012 | 0.009 |
| 6    | -0.007 | -0.004 | -0.005 | 0.023 | 0.018 | 0.026 | 0.021 | 0.021 | 0.017 |
| 7    | -0.002 | -0.007 | -0.006 | 0.015 | 0.013 | 0.018 | 0.021 | 0.013 | 0.016 |
| 8    | -0.005 | -0.009 | -0.008 | 0.010 | 0.008 | 0.016 | 0.014 | 0.016 | 0.018 |

*Fig. 19*

|          | Card |       |       |       |       |       |       |       |
| ---      | ---  | ---   | ---   | ---   | ---   | ---   | ---   | ---   |
| Card     | Ace  | 2     | 3     | 4     | 5     | 6     | 7L    | 8     |
| Raw      | 0.032 | 0.032 | 0.026 | 0.032 | 0.027 | 0.026 | 0.021 | 0.018 |
| Improved | 0.902 | 0.451 | 0.317 | 0.355 | 0.329 | 0.2641 | 0.231 | 0.2045 |

*Fig. 20*

REMOTE SENSING OF HIDDEN OBJECTS

CROSS-REFERENCE TO RELATED APPLICATIONS

This application claims the benefit of and priority to U.S. Provisional Application Ser. No. 61/454,728, entitled "Indirect Photography—the remote sensing of hidden objects," filed on Mar. 21, 2011, the entirety of which is incorporated by reference herein.

RIGHTS OF THE GOVERNMENT

The invention described herein may be manufactured and used by or for the Government of the United States for all governmental purposes without the payment of any royalty.

FIELD OF THE INVENTION

The present invention generally relates to photographing an object and, more particularly, to photographing the object when the object is not in a direct line of sight of a camera.

BACKGROUND OF THE INVENTION

A photographic technique known as dual photography, which exploits Helmholtz reciprocity, allows for the position of a digital camera and a digital light source to be mathematically interchanged. This mathematical interchange was originally developed to aid in the rendering of computer generated scenes and enabled the scene to be "viewed" from the position of the original light source a though "illuminated" from the position of the original camera. An original purpose of this methodology was to show how dual photography could be used to capture and relight scenes. Subsequent work concentrated on the creation of adaptive and non-adaptive algorithms to more efficiently capture the large amounts data necessary to build the light transport matrices require for the technique to work. Because the original goal of dual photography was the rendering and relighting of computer generated scenes, no attempt was made to recover details from the scene not directly visible to either the camera or the digitized light source. Additionally, no work has been performed related to describing the quality of the dual image. Neither of these oversights effected the exploitation of dual photography for the original intended purposes. Nevertheless, for applications outside the computer graphics community, the recovery of scene information not directly visible to either the camera or the light source and a metric of the quality of the dual image may be of considerable interest.

In one of the configurations used to demonstrate the dual photography methodology, a playing card was positioned such that the face of the playing card was not visible to a camera. A pixilated light source, projector, was placed with a full view of the face of the playing card and a book was placed so that when a pixel illuminated the playing card, reflections from the card could be imaged by the camera after an intermediary reflection from the book.

The pixels of the projector individually illuminated the playing card and the subsequent reflections from the card onto the book were imaged by the camera. Using Helmholtz reciprocity to mathematically interchange a digital light source and a camera as know in the art, the projector was converted to a "virtual camera" and the face of the playing card was revealed to be the King of Hearts.

While the technique of dual photography is effective for its original purpose, for most applications outside the field of computer generated graphics, there is no reason to attempt dual photography as described above. If it is possible to place a pixilated light source in a position to directly view the object of interest, it is much easier to position a camera in that position and image the object directly instead of going through the complicated and data intensive process of creating a dual image. There are, however, many applications where discretely viewing an object hidden from direct view of a camera may be of interest. Extending the concept of dual photography into one of indirect photography, where neither the camera nor the controlling light source has a direct line-of-sight to the object of interest would open up countless new opportunities in the field of remote sensing and the other fields of study.

Therefore, there is a need in the art for a photographic methodology which allows for the relief of the line-of-sight requirement and while still capturing scene information not previously available to be recovered.

SUMMARY OF THE INVENTION

Embodiments of the invention provide an apparatus for creating an indirect image of an object. The embodiments include a light source and an imaging system. Light emitted from the light source is reflected by a first non-specular surface toward the object. Light reflected by the object is further reflected by a second non-specular surface toward the imaging system. The imaging system is configured to create the indirect image from the reflected light. Neither the light source nor the imaging system is in a direct line of sight of the object.

In some embodiments, the imaging system includes a camera, and that camera may be a digital camera. The imaging system is configured to improve image quality of the indirect image. In some embodiments, the image quality may be improved with a deconvolution process, such as a blind deconvolution, for example. In other embodiments, the image quality may be improved with an optimization process.

The light source, in some embodiments, is a laser, which may, in some of the embodiments, be co-located with the imaging system. The first and second non-specular surfaces may have the same surface finish or may have a different surface finish. In some embodiments, the first and second non-specular surface are the same surface.

Embodiments of the invention also provide a method of creating an indirect image of an object. Light is emitted from a light source. The emitted light is reflected toward the object by a first non-specular surface. Light reflected by the object is reflected toward an imaging system by a second non-specular surface. The reflected light is received by the imaging system, which in turn creates the indirect image from the reflected light.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 17 is a table of indirect image quality at different resolutions for the playing card of FIG. 15.

FIG. 19 is a table of playing card selection criteria used to identify the playing card of FIG. 18.

FIG. 20 is a table showing indirect image improved image quality

Figure 1:
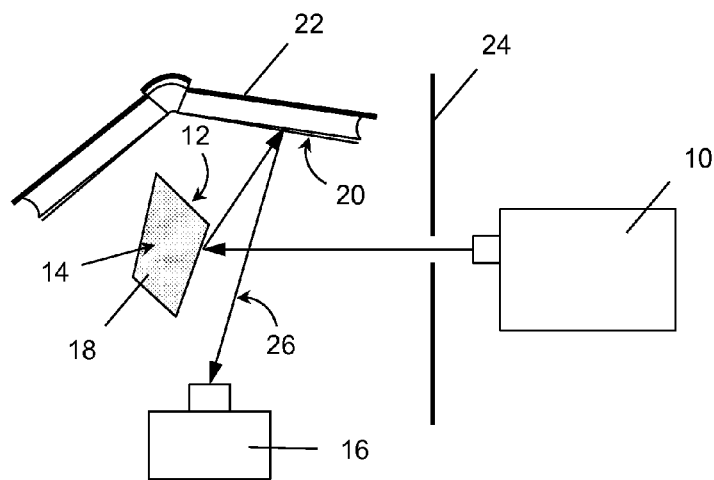
FIG. 1 is a schematic diagram of a prior art dual photography set up.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

As set out above, dual photography exploits Helmholtz reciprocity to mathematically interchange a digital light source and a camera. This allows for a scene to be viewed from the perspective of an original light source as though lit by an original camera. While the primary goal of dual photography has generally been to aid in the proper lighting and shadow generation for computer generated graphics, the ability to extract information from a scene not directly visible to the imaging system would have profound military and intelligence implications. However, in order to make a militarily significant impact, however, a limitation of dual photograph that either the camera or the digitized light source must have direct line-of-sight to the portion of the scene of interest must be eliminated.

Dual photography consists of a pixilated light source used to illuminate a scene and a digital camera used to record reflections of the illumination either directly or after a subsequent reflection from an additional non-specular reflector. The recorded images are then used to create a transport matrix T, which maps the light transport characteristics from each pixel in the light source to each pixel in the camera after interacting with the scene of interest. Due to the linearity of light transport, the above interactions may be described by the following matrix equation:

$$c' = Tp' \qquad (1),$$

where p' is a mn×1 column vector representing the pixilated light source with m×n pixels, c' is a pq×1 column vector representing the camera with p×q pixels, and T is the pq×mn transport matrix which takes into account all possible transport paths from the source pixels to the camera pixels. The T matrix can be formed by placing the columnated image recorded by the camera into the column represented by a row of the pixels lit to form the image. The prime superscript (') represents working in the primal or real world configuration.

Helmholtz reciprocity allows for differential light sources and detectors within a scene to be interchanged without affecting the transport characteristics of light or the transfer of energy between the two. This in turn allows for the light transport from the real world camera to the real world projector described earlier to be represented by:

$$p'' = T^T c'' \qquad (2),$$

where $T^T$ is the transpose of the matrix T and the double prime superscript (") represents working in the dual configuration. Equation (2) implies that if the transport matrix is known, the camera can be mathematically turned into a virtual projector and likewise the projector turned into a virtual camera. One configuration illustrating the principle of dual photography without direct transport is shown in FIG. 1.

A projector 10 illuminates a front 12 of a playing card 14 while a camera 16 sees only a back 18 of the card 14 and a diffuse page 20 of a book 22. An aperture 24 in front of the projector 10 limits the illumination only onto the card 14. The card 14 was adjusted so that its specular lobe from the projector 10 did not land on the book 22. Thus, the only light 26 that reached the camera 16 underwent a diffuse bounce at the card 14 and another at the book 22.

Figure 2:
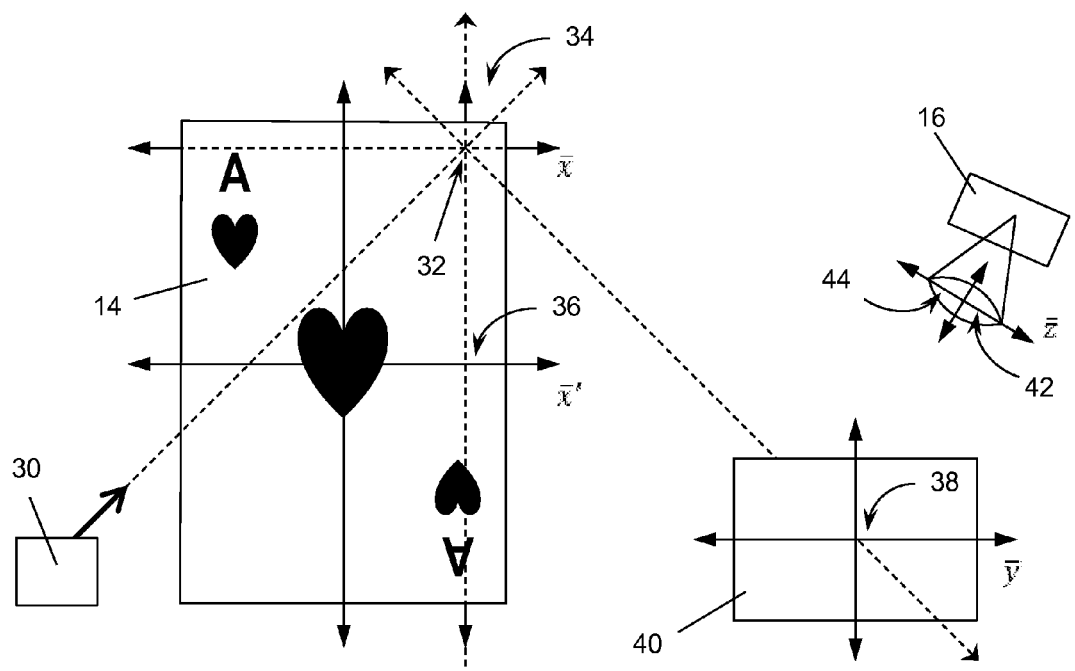
FIG. 2 is a schematic diagram illustrating dual photography coordinate systems.

Extending the concept of the dual photography, the configuration illustrated in FIG. 1 may be radiometrically modeled using the setup in FIG. 2. In this particular configuration, a laser 30 is used as the illumination source instead of the pixilated projector 10, although other spot type light sources may also be used. Additionally, instead holding the object 14 (the playing card of FIG. 1) fixed and moving the laser spot 32, the laser 30 will be fixed and the playing card 14 will be translated, though the reverse is also possible. Four coordinate systems, three fixed with respect to each other, and one fixed to the object 14, will be used. The $\bar{x}$ coordinate system 34 is a fixed coordinate system in-plane with the object's translation. The laser spot 32 is centered at the origin of this coordinate system which is referred to as the fixed object frame of reference. The $\bar{x}'$ coordinate system 36 is attached to the object 14 with the center of the object at the origin. This is the only coordinate system that changes with respect to any other coordinate system during the creation of the dual photograph. The $\bar{y}$ coordinate system 38 is attached to the non-specular surface 40 imaged by the camera 16 and will be referred to as the imaged reflector. The $\bar{z}$ coordinate system 42 is fixed and attached to the lens 44 of the imaging system (camera 16).

Using the configuration in FIG. 2, an irradiance due to the laser 30 in the fixed object frame of reference 34 is $E_{obj}(\bar{x})$ where $\bar{x}$ is a position in the fixed object frame of reference 34. Given the irradiance in the object frame of reference, the radiance from the object frame of reference is:

$$L_{obj}(\bar{x},\bar{x}',\theta_{obj},\Omega'_{obj})=E_{obj}(\bar{x})f_{obj}(\bar{x},\bar{x}',\theta_{obj},\Omega'_{obj}) \quad (3)$$

where $\bar{x}'$ is the offset between the object coordinate system 36 and the fixed object frame of reference 34, $\theta_{obj}$ is the incident angle of irradiation with respect to the normal of the object 14, $\Omega'_{obj}$ is the reflected solid angle from the object 14, and $f_{obj}$ is the bidirectional reflectance distribution function ("BRDF") of the object 14. Assuming the BRDF of the object 14 is isotropic and uniformly scaled in magnitude by the reflectance of the object 14 at that point, the BRDF of the object can be rewritten as:

$$f_{obj}(\bar{x},\bar{x}',\theta_{obj},\Omega'_{obj})=\rho(\bar{x}'-\bar{x})f_{geo}(\bar{x},\theta_{obj},\Omega'_{obj}) \quad (4),$$

where $f_{geo}$ is the underlying angular shape of the BRDF that is scaled by $\rho$, the reflectance of the object 14 at that point $\bar{x}$. Substituting equation (4) into equation (3), the radiance of the object 14 becomes:

$$L_{obj}(\bar{x},\bar{x}',\theta_{obj},\Omega'_{obj})=E_{obj}(\bar{x})\rho(\bar{x}'-\bar{x})f_{geo}(\bar{x},\theta_{obj},\Omega'_{obj}) \quad (5)$$

Given the radiance of the object reflector, the differential irradiance on the imaged reflector from the differential area on the object is:

$$dE_{im}(\bar{x},\bar{x}',\theta_{obj},\Omega'_{obj},\theta_{im})=L_{obj}(\bar{x},\bar{x}',\theta_{obj},\Omega'_{obj})\cos\theta_{im}\cdot d\Omega_{im} \quad (6),$$

where $\theta_{im}$ is the incident angle with respect to the normal onto the imaged reflector and $d\Omega_{im}$ is the differential solid angle incident on the imaged reflector that is subtended by the differential projected area of the object 14. Given the fixed geometry of the configuration, $\Omega'_{obj}$, $\cos\theta_{im}$ and $d\Omega_{im}$ depend only on the position in the fixed object frame of reference 34 and on the imaged reflector 40, therefore they can be written solely as functions of $\bar{x}$ and $\bar{y}$. Rewriting equation (6) in terms of $\bar{x}$ and $\bar{y}$:

$$dE_{im}(\bar{x},\bar{x}',\bar{y},\theta_{obj})=L_{obj}(\bar{x},\bar{x}',\bar{y},\theta_{obj})\cos\theta_{im}(\bar{x},\bar{y})d\Omega_{im}(\bar{x},\bar{y}) \quad (7).$$

Using the definition of a solid angle, the differential irradiance on the imaged reflector becomes:

$$dE_{im}(\bar{x},\bar{x}',\bar{y},\theta_{obj}) = \qquad (8)$$
$$L_{obj}(\bar{x},\bar{x}',\bar{y},\theta_{obj})\cos\theta_{im}(\bar{x},\bar{y})\left(\frac{\cos\theta'_{obj}(\bar{x},\bar{y})}{r^2_{im}(\bar{x},\bar{y})}dA_{obj}(\bar{x})\right)$$

where $\theta'_{obj}$ is the angle of the reflected radiance with respect to the normal of the differential area of the object 14, $r_{im}$ is the range between $\bar{x}$ and $\bar{y}$, and $dA_{obj}$ is the differential area of the object 14. By combining like terms, equation (8) can be rewritten as:

$$dE_{im}(\bar{x},\bar{e}',\bar{y},\theta_{obj})=L_{obj}(\bar{x},\bar{x}',\bar{y},\theta_{obj})\alpha(\bar{x},\bar{y})dA_{obj}(\bar{x}) \quad (9),$$

where $$\alpha(\bar{x},\bar{y}) = \left(\frac{\cos\theta'_{im}(\bar{x},\bar{y})\cos\theta'_{obj}(\bar{x},\bar{y})}{r^2_{im}(\bar{x},\bar{y})}\right). \quad (10)$$

Again, given the irradiance on the imaged reflector, the radiance for the imaged reflector 40 can be written as:

$$L_{im}(\bar{x},\bar{x}',\bar{y},\bar{z},\theta_{obj})=E_{im}(\bar{x},\bar{x}',\bar{y},\theta_{obj})f_{im}(\bar{x},\bar{y},\bar{z}) \quad (11),$$

where $f_{im}$ is the BRDF of the imaged reflector 40, the incident angle has been converted into positions on the object reflector ($\bar{x}$ and $\bar{y}$) and the reflected solid angle has been converted to positions on the imaged reflector and the lens ($\bar{y}$ and $\bar{z}$).

Given the radiance from the imaged reflector 40, the differential irradiance at any point on the lens 44 from a differential area on the imaged reflector 40 is:

$$dE_{lens}(\bar{x},\bar{x}',\bar{y},\bar{z},\theta_{obj}) = \qquad (12)$$
$$L_{im}(\bar{x},\bar{x}',\bar{y},\bar{z},\theta_{obj})\cos\theta_{lens}(\bar{y},\bar{z})\left(\frac{\cos\theta'_{im}(\bar{y},\bar{z})}{r^2_{lens}(\bar{y},\bar{z})}dA_{im}(\bar{y})\right)$$

where $\theta_{lens}$ is the incident angle with respect to the normal of the lens 44, $\theta_{im}'$ is the reflected angle with respect to the normal of the imaged reflector 40, $r_{lens}$ is the distance between $\bar{y}$ and $\bar{z}$, and $dA_{im}$ is the differential area on the imaged reflector 40. Again combining like terms, equation (12) can similarly be simplified to:

$$dE_{lens}(\bar{x},\bar{x}',\bar{y},\bar{z},\theta_{obj})=L_{im}(\bar{x},\bar{x}',\bar{y},\bar{z},\theta_{obj})\beta(\bar{y},\bar{z})dA_{im} \quad (13),$$

where $$\beta(\bar{y},\bar{z}) = \left(\frac{\cos\theta_{lens}(\bar{y},\bar{z})\cos\theta'_{im}(\bar{y},\bar{z})}{r^2_{lens}(\bar{y},\bar{z})}\right). \quad (14)$$

Given equation (13) and by using equations (5), (9), and (11), the irradiance on the lens 44 for a given object position, $\bar{x}'$, is (equation 15):

$$E_{lens}(\bar{x}',\bar{z},\theta_{obj})=\int_{im}\int_{obj}E_{obj}(\bar{x})\rho(\bar{x}'-\bar{x})f_{geo}(\bar{x},\bar{y},\theta_{obj})$$
$$f_{im}(\bar{x},\bar{y},\bar{z})\alpha(\bar{x},\bar{y})\beta(\bar{y},\bar{z})d\bar{x}d\bar{y}$$

If the irradiance outside the laser spot on the object is zero, equation (15) can be rewritten as (equation 16):

$$E_{lens}(\bar{x}\bar{x}',\bar{z},\theta_{obj})=\int_{im}\int_{las}E_{obj}(\bar{x})\rho(\bar{x}'-\bar{x})f_{geo}(\bar{x},\bar{y},\theta_{obj})$$
$$f_{im}(\bar{x},\bar{y},\bar{z})\alpha(\bar{x},\bar{y})\beta(\bar{y},\bar{z})d\bar{x}d\bar{y}$$

and the total flux collected by the lens for a given pixel in the camera can be written as:

$$\Phi_{pix_i}(\bar{x}',\theta_{obj})=\int_{lens}\int_{fov_i}\int_{las}E_{obj}(\bar{x})\rho(\bar{x}'-\bar{x}) \qquad (17)$$
$$f_{geo}(\bar{x},\bar{y},\theta_{obj})f_{im}(\bar{x},\bar{y},\bar{z})\alpha(\bar{x},\bar{y})\beta(\bar{y},\bar{z})d\bar{x}d\bar{y}d\bar{z}$$

where $fov_i$ is the projected area of camera pixel i on the imaged reflector when $d\bar{x}$ is integrated over the laser spot, $d\bar{y}$ is integrated over the projected area of pixel i projected on the imaged reflector ($fov_i$), and $d\bar{z}$ is integrated over the lens of the imaging system. The order of integration can be rearranged and equation (17) simplified to:

$$\Phi_{pix_i}(\bar{x}',\theta_{obj})=\int_{las}\Gamma_i(\bar{x}',\theta_{obj})\rho(\bar{x}'-\bar{x})d\bar{x} \quad (18)$$

where $$\Gamma_i(\bar{x}',\theta_{obj})=\int_{lens}\int_{fov_i}E_{obj}(\bar{x})f_{geo}(\bar{x},\bar{y},\theta_{obj})f_{im}(\bar{x},\bar{y},\bar{z},)$$
$$\alpha(\bar{x},\bar{y})\beta(\bar{y},\bar{z})d\bar{y}d\bar{z} \qquad (19)$$

As a consequence of equation (18), a dual image may be created by using any single pixel, group of pixels, or the entire digital image without explicit knowledge of the geometry, as long as the same set of pixels is used to create the dual image across all of the recorded images. Furthermore, equation (18) may be rewritten with a change of variables:

$$\Phi_{pix_i}(\bar{x}',\theta_{obj})=\int_{las}\Gamma_i(\bar{x}'-\bar{x}'',\theta_{obj})\rho(\bar{x}'')d\bar{x}'' \quad (20)$$

with $\Gamma_i$ being the convolution kernel, i.e., the point spread function, for the dual image. If the irradiance of the laser spot and some knowledge of the BDRF's and geometries in $\Gamma_i$ are known, the quality of the dual image can be improved by a deconvolution of the dual image and this kernel. It is this improvement of the image quality by deconvolution of the irradiance on the object of interest and the BRDF properties of that object that has been shown can be exploited to expand the concept of dual photography and allow for the recovery of information that is not directly visible to either the controlling illumination source or the digital camera.

Figure 3:
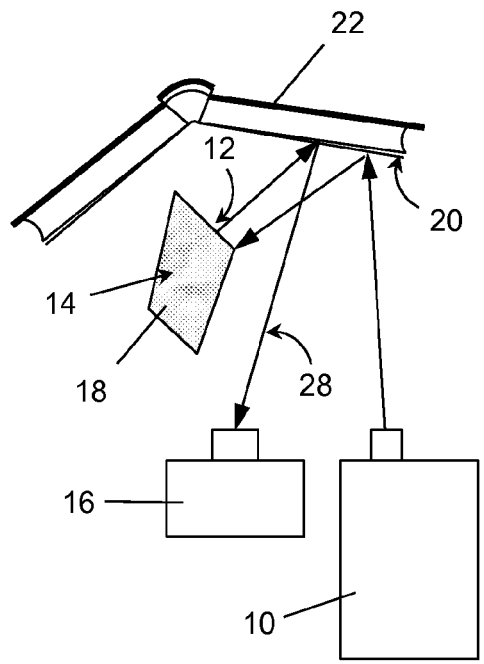
FIG. 3 is a schematic diagram of an indirect photography set up consistent with embodiments of the invention.

As set forth above, one limiting factor of dual photography is the requirement for the illumination source or the camera to have a direct view of the object of interest. By moving the projector 10 of FIG. 1 adjacent to the camera 16, the projector 10 does not illuminate the face 12 of the playing card 14, but rather illuminates the diffuse page 20 of the book 22 as illustrated in FIG. 3. To aid in the modeling of this configuration, as illustrated in FIG. 4, a first surface 46 has been separated from the image reflector 40 and an addition fixed reference frame $\overline{w}$ 48 is added to describe the first non-specular surface 46 which will also be referred to as the wall reflector.

Figure 4:
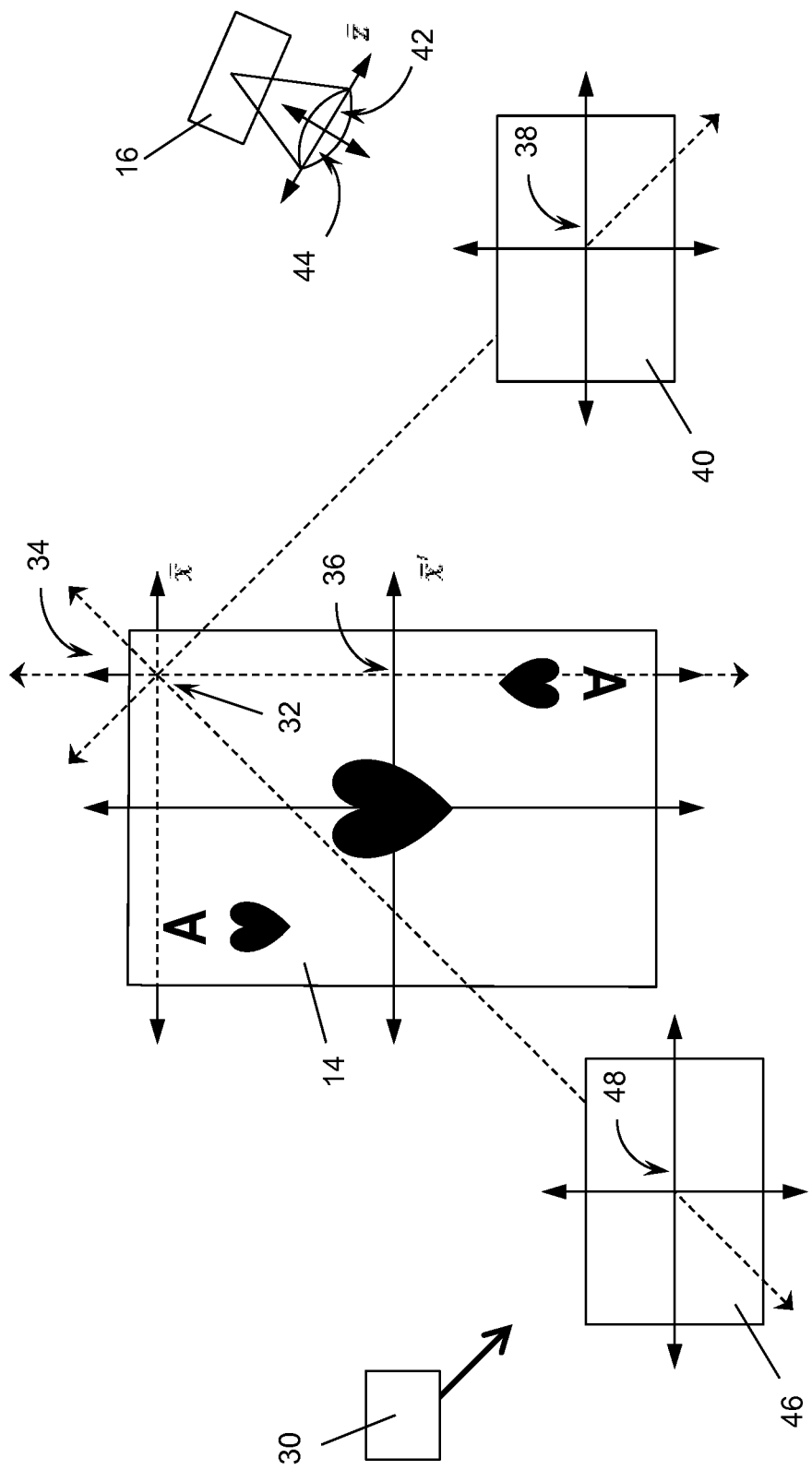
FIG. 4 is a schematic diagram illustrating indirect photography coordinate systems consistent with an embodiment of the invention.

Using the configuration in FIG. 4, the irradiance on the wall reflector 46 is $E_{wall}(\overline{w})$ where $\overline{w}$ is the position on the wall reflector 46. The radiance from the wall is:

$$L_{wall}(\overline{w},\overline{x},\theta_{wall}) = E_{wall}(\overline{w}) f_{wall}(\overline{w},\overline{x},\theta_{wall}) \quad (21)$$

where $\overline{x}$ is again the position in the fixed object frame of reference 34, and $f_{wall}$ is the BRDF of the wall reflector 46. As set out above, the reflected solid angle is considered a function of the respective positions on the wall reflector 46 and the fixed object frame of reference 34 and $\theta_{wall}$ is the incident angle with respect to the normal on the wall reflector 46.

Given the radiance from a differential area of the wall, the differential irradiance on the object frame of reference is:

$$dE_{obj}(\overline{w}, \overline{x}, \theta_{wall}) = L_{wall}(\overline{w}, \overline{x}, \theta_{wall}) \cos\theta_{obj}(\overline{w}, \overline{x}) \left( \frac{\cos\theta'_{wall}(\overline{w}, \overline{x})}{r_{obj}^2(\overline{w}, \overline{x})} dA_{wall}(\overline{w}) \right), \quad (22)$$

where the incident solid angle has again been converted to projected area and range, $\theta_{obj}$ is again the incident angle with respect to the normal in the object frame of reference 34, $\theta'_{wall}$ is the angle with respect to the normal of the radiance from the wall, $r_{obj}$ is the range between the wall and the object frame of reference 36, and $dA_{wall}$ is the differential area of the wall. Again, by combining like terms, equation (22) can be rewritten as:

$$dE_{obj}(\overline{w},\overline{x},\theta_{wall}) = l_{wall}(\overline{w},\overline{x},\theta_{wall}) \gamma(\overline{w},\overline{x}) dA_{wall}(\overline{w}) \quad (23),$$

where:

$$\gamma(\overline{w}, \overline{x}) = \frac{\cos\theta'_{wall}(\overline{w}, \overline{x})\cos\theta_{obj}(\overline{w}, \overline{x})}{r_{obj}^2(\overline{w}, \overline{x})}. \quad (24)$$

Equations (21) and (23) can now be substituted into equation (17):

$$\Phi_{pix_i}(\overline{x}',\theta_{wall}) = \int_{las}\int_{card}\int_{fov}\int_{lens} E_{wall}(\overline{w}) f_{wall}(\overline{w},\overline{x},\theta_{wall}) \\ \gamma(\overline{w},\overline{x}) \rho(\overline{x}'-\overline{x}) f_{geo}(\overline{w},\overline{x},\overline{y}) f_{im}(\overline{x},\overline{y},\overline{z}) \alpha(\overline{x},\overline{y}) \beta(\overline{y},\overline{z}) \\ d\overline{z} d\overline{y} d\overline{x} d\overline{w} \quad (25)$$

where once again, $d\overline{z}$ is integrated over the area of the lens 44 and $d\overline{y}$ is integrated over the projected area of the camera pixel i on the imaged reflector 40. Due to the additional reflector, $d\overline{x}$ is now integrated over the entire object 14 (playing card in FIG. 4) and $d\overline{w}$ is integrated over the laser spot 32. Equation (25) can be simplified to:

$$\Phi_{pix_i}(\overline{x},\theta_{wall}) = \int_{las}\int_{card} \Gamma_i(\overline{w},\overline{x}) E_{wall}(\overline{w}) f_{wall}(\overline{w},\overline{x},\theta_{wall}) \\ \gamma(\overline{w},\overline{x}) \rho(\overline{x}'-\overline{x}) d\overline{x} d\overline{w} \quad (26),$$

where:

$$\Gamma_i(\overline{w},\overline{x}) = \int_{fov}\int_{lens} f_{geo}9\overline{w},\overline{x},\overline{y}) f_{im}(\overline{x},\overline{y},\overline{z}) \alpha(\overline{x},\overline{y}) \beta(\overline{y},\overline{z}) d\overline{z} d\overline{y} \quad (27)$$

The order of integration can be rearranged and equation (26) may be further simplified to:

$$\Phi_{pix_i}(\overline{x}',\theta_{wall}) = \int_{card} T_i(\overline{x},\theta_{wall}) \rho(\overline{x}'-\overline{x}) d\overline{x} \quad (28),$$

where:

$$T_i(\overline{x},\theta_{wall}) = \int_{las} \Gamma_i(\overline{w},\overline{x},\theta_{wall}) E_{wall}(\overline{w}) f_{wall}(\overline{w},\overline{x},\theta_{wall}) \\ \gamma(\overline{w},\overline{x}) d\overline{w} \quad (29)$$

As with equation (18), a consequence of equation (28) is an indirect image may be created by using any single pixel, group of pixels or the entire digital image without explicit knowledge of the geometry, as long as the same set of pixels is used to create the indirect image across all of the recorded images. Likewise, equation (28) can be rewritten with a change of variables:

$$\Phi_{pix_i}(\overline{x}',\theta_{wall}) = \int_{card} T_i(\overline{x}'-\overline{x},\theta_{wall}) \rho(\overline{x}'') d\overline{x}'' \quad (30),$$

where $T_i$ is again the convolution kernel, i.e., the point spread function, for the indirect image. While equation (30) suggests it is theoretically possible to recover $\rho$ through the use of a blind deconvolution technique, basic knowledge of the BRDF of the reflection surfaces may assist in improving the deconvolution and therefore the resulting image quality of the indirect image.

While standard deconvolution may be used to improve the image quality of the indirect images, the formation of the indirect images creates symmetries, which may assist in improving the deconvolution process. To create a matrix representation of indirect photography, each component of the indirect photography equation (25) may be represented by a matrix resulting in the following equation:

$$\mathbb{D} = (\mathbb{B} \odot \mathbb{A}_{im}) \cdot (\mathbb{F} \odot \mathbb{F}_{ph}) \cdot \mathbb{P} \odot (\mathbb{G} \odot \mathbb{F}_w) \cdot \mathbb{E}_w) \quad (31), \text{ where}$$

"$\mathbb{D}$" is a y×n matrix representing the data, y is the number of pixels in the camera 16 and n is the number of data images.

"$\mathbb{E}$" is a w×n matrix representing the irradiance on the wall reflector 46 and w is the number of individual points on the wall.

"$\mathbb{F}_w$" is a x×w matrix representing the BRDF of the wall from every point on the wall to every point in the fixed object frame of reference 34.

"$\mathbb{G}$" is a x×w matrix representing the geometry terms ($\gamma$) from every point on the wall to every point in the fixed object frame of reference 34.

"$\mathbb{P}$", the object reflectance matrix, is a x×n matrix representing the position of the object of interest in the fixed object frame of reference 34 for every data image.

"$\mathbb{F}_{ph}$" is a y×x matrix representing the BRDF from the fixed object frame of reference 34 to the imaged reflector 40 and y is the number of pixels in the camera 16. (The points on the imaged reflector correspond to the projection of the camera's pixels onto the imaged reflector 40.)

"$\mathbb{A}$" is a y×x matrix representing the geometry terms ($\alpha$) from every point in the fixed object frame of reference 34 to every point on the imaged reflector 40.

"$\mathbb{F}_{im}$" is a y×y matrix representing the BRDF from the imaged reflector 40 to the lens 44 of the imaging system, which is subsequently focused on the camera's individual pixels. (With an ideal imaging system, $\mathbb{F}_{im}$ would be a diagonal matrix, i.e. each pixel is perfectly focused.)

"$\mathbb{B}$" is a y×y matrix representing the geometry terms ($\beta$) from every point in the fixed object frame of reference 34 to the pixels in the camera 16.

"·" represents standard matrix multiplication.

"$\odot$" represents the Hadamard product.

With a goal of recovering the image represent by any column of the object reflectance matrix, $\mathbb{P}$, the matrices before and after the reflectance matrix may be evaluated to form the equation:

$$\mathbb{D}_{y \times n} = \mathbb{Q}_{y \times x} \cdot \mathbb{P}_{x \times n} \odot \mathbb{R}_{x \times n} \quad (32),$$

where:

$$\mathbb{Q}_{y \times x} = (\mathbb{B} \odot \mathbb{F}_{im})_{y \times y} \cdot (\mathbb{A} \odot \mathbb{F}_{ph})_{y \times y} \quad (33), \text{ and}$$

$$\mathbb{R}_{x \times n} = (\mathbb{G} \odot \mathbb{F}_{wall})_{x \times w} \cdot \mathbb{E}_{wall_{w \times n}} \quad (34).$$

Based on the unknown BRDFs of both the imaged reflector 40, $\mathbb{F}_{im}$, and the phase function of the object 14, $\mathbb{F}_{ph}$, as well as the unknown geometry of the setup between the object 14, the imaged reflector 40, and the lens 44 of the imaging system, very little, if anything, may be definitely stated about the structure of the $\mathbb{Q}$ matrix without a priori knowledge. Therefore, the $\mathbb{Q}$ matrix, in its most general form, may be represented by a y×x matrix of unknown elements.

$$\mathbb{Q}_{y \times x} = \begin{bmatrix} q_{11} & \cdots & q_{1x} \\ \vdots & \ddots & \vdots \\ q_{y1} & \cdots & q_{yx} \end{bmatrix}. \quad (35)$$

Since both the dual and indirect photography algorithms require the same set of pixels from each data image to be used to create the image, the $\mathbb{Q}$ matrix may be represented by a row vector:

$$\mathbb{Q}_{y \times x} = [q_1, q_2, \ldots, q_n] \quad (36).$$

Figure 5:
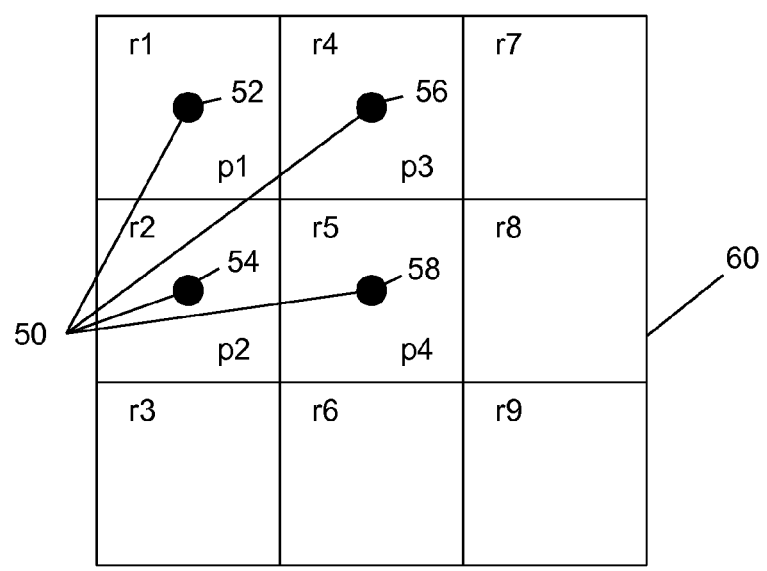
FIG. 5 is a schematic representation of a 2×2 irradiance pattern for a first data image.
Figure 6:
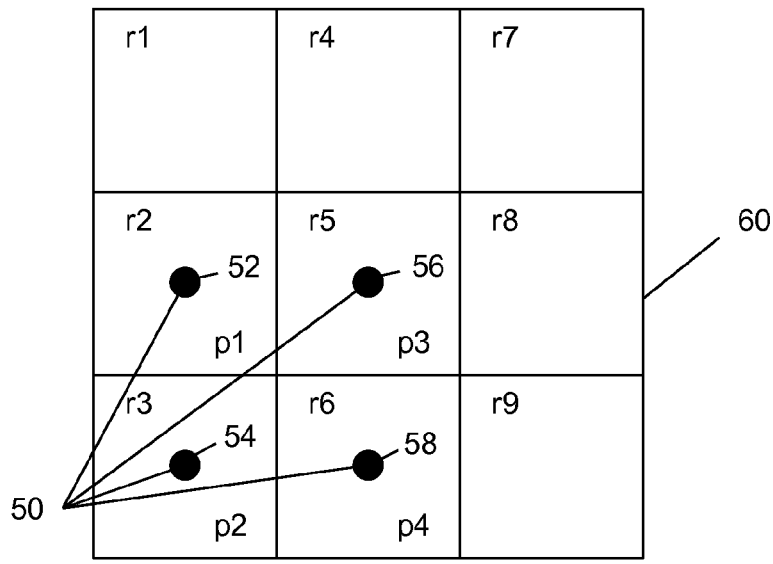
FIG. 6 is a schematic representation of a 2×2 irradiance pattern of FIG. 5 for a second data image.

The structure of the object reflectance matrix, $\mathbb{P}$, and the irradiance matrix, $\mathbb{R}$, may be determined by the number of data images taken, n, the distance the object of interest is translated between each data image in comparison to the size of the object of interest, and the pattern in which the object is translated. For example, a simple exemplary embodiment having an object 50 with four distinctive points 52-58 in a two-by-two square pattern will be used for illustration. A first data image may be acquired for an indirect image as described in more detail below. The object 50 is then translated vertically downward a distance equal to one half the vertical length of the object 50 and a second data image is acquired. For the second data image, the irradiance on the upper left quadrant of the object 50 will be the same as the irradiance on the lower left quadrant of the object 50 in the first image. Likewise, the irradiance on the upper right quadrant of the object 50 in the second data image is the same as the irradiance on the lower right quadrant of the first data image. FIGS. 5-8 illustrate this symmetry. FIG. 5 represents the position of the object 50 when the first data image is acquired in comparison to the irradiance in the fixed object frame of reference 60. FIG. 6 illustrates the position of the object 50 after the translation vertically downward. In both cases, the upper left designators ("r#") represent the irradiance in the fixed object frame of reference 60 and the lower right designators ("p#") represent the reflectance of that quadrant of the object 50.

Figure 7:
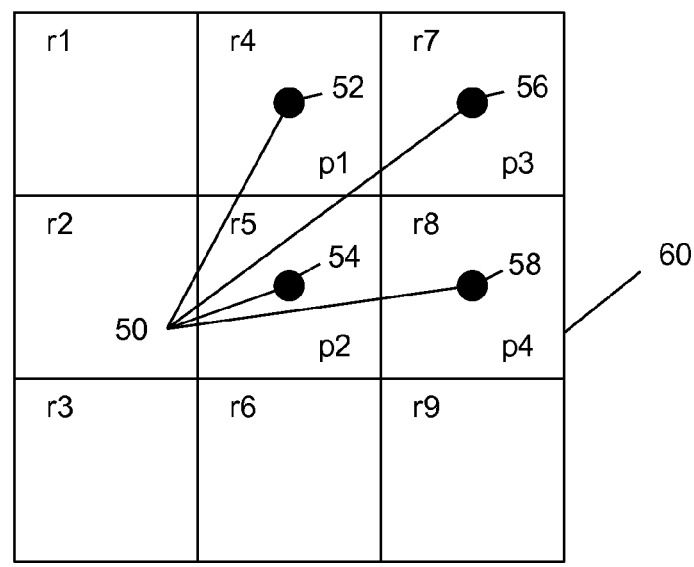
FIG. 7 is a schematic representation of a 2×2 irradiance pattern of FIG. 5 for a third data image.
Figure 8:
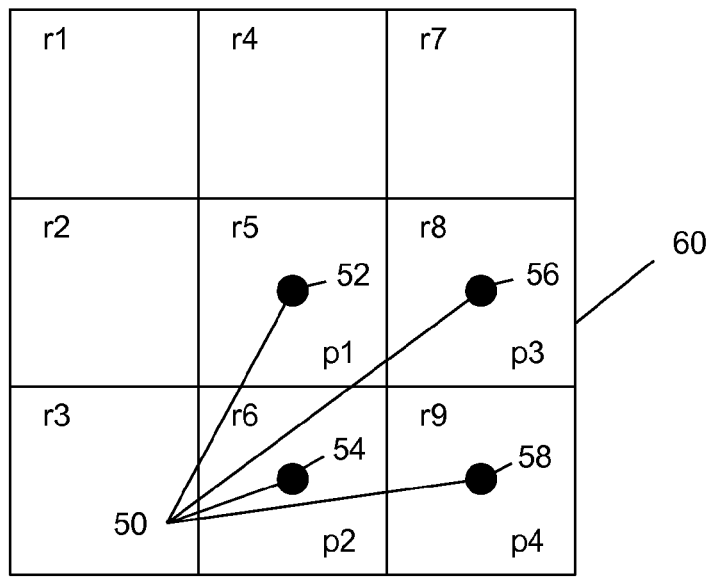
FIG. 8 is a schematic representation of a 2×2 irradiance pattern of FIG. 5 for a fourth data image.

Following the second data image, the object is translated vertically up, to the original vertical position and then horizontally to the right, a distance equal to one half the horizontal width of the object 50 resulting in the configuration illustrated in FIG. 7. In this position, the irradiance on the upper and lower left quadrants of the object are the same as the irradiance on the upper and lower right quadrants of the object 50 in the first data image. FIG. 8 illustrates the position of the object 50 in the fixed object frame of reference 60 after it has been translated vertically downward from the position of the object in the third data image. The relationship between the irradiance in the fixed object frame of reference 60 and reflectance of the object 50 between the third and fourth data images is the same as the relationship previously described between the first and second data images.

Given a fixed geometry between a wall reflector (not shown) and the fixed object frame of reference 60, the irradiance in the fixed object frame of reference 60 is unchanged from one data image to the next. Given the embodiment illustrated in FIGS. 5-8, the irradiance matrix, $\mathbb{R}$, may be represented by:

$$\mathbb{R}_{x \times n} = \begin{bmatrix} r_1 & r_1 & r_1 & r_1 \\ r_2 & r_2 & r_2 & r_2 \\ r_3 & r_3 & r_3 & r_3 \\ r_4 & r_4 & r_4 & r_4 \\ r_5 & r_5 & r_5 & r_5 \\ r_6 & r_6 & r_6 & r_6 \\ r_7 & r_7 & r_7 & r_7 \\ r_8 & r_8 & r_8 & r_8 \\ r_9 & r_9 & r_9 & r_9 \end{bmatrix} \quad (37)$$

where the individual elements $r_1$, $r_2$, etc., represent the irradiance incident on the specific area in the fixed object frame of reference 60. In a more general form, the irradiance matrix, $\mathbb{R}$, may be written as a Kronecker product of two vectors R and $e_n^T$, $\mathbb{R} = R \otimes e_n^T$, where R is the column vector that results from applying the Vec ($\otimes$) operator on the matrix describing the irradiance in the fixed object frame of reference 60 and the vector $e_n$ is a column vector of n ones where n is the number of data images. In the embodiment illustrated in FIGS. 5-8, R and $e_n$ may be represented by:

$$R = \begin{bmatrix} r_1 \\ r_2 \\ r_3 \\ r_4 \\ r_5 \\ r_6 \\ r_7 \\ r_8 \\ r_9 \end{bmatrix} \text{ and } e_n = \begin{bmatrix} 1 \\ 1 \\ 1 \\ 1 \end{bmatrix}. \quad (38), (39)$$

The object reflectance matrix, $\mathbb{P}$, is an x×n matrix where, for each column of the matrix, the Vec ($\otimes$) operator has been applied to the matrix describing the object 50 in the fixed object frame of reference 60 corresponding to the data image. The $\mathbb{P}$ matrix for the embodiment illustrated in FIGS. 5-8 is:

$$\mathbb{P}_{x \times n} = \begin{bmatrix} p_1 & 0 & 0 & 0 \\ p_2 & p_1 & 0 & 0 \\ 0 & p_2 & 0 & 0 \\ p_3 & 0 & p_1 & 0 \\ p_4 & p_3 & p_2 & p_1 \\ 0 & p_4 & 0 & p_2 \\ 0 & 0 & p_3 & 0 \\ 0 & 0 & p_4 & p_3 \\ 0 & 0 & 0 & p_4 \end{bmatrix}, \quad (40)$$

where the rows of the matrix correspond to the distinctive points in the fixed object frame of reference 60 and the columns correspond to the different data images. Substituting equations (36), (37), and (40) into equation (32), the equation for the data matrix becomes:

$$\mathbb{D}_{1\times n} = [q_1 \ldots q_9] \cdot \left( \begin{bmatrix} p_1 & 0 & 0 & 0 \\ p_2 & p_1 & 0 & 0 \\ 0 & p_2 & 0 & 0 \\ p_3 & 0 & p_1 & 0 \\ p_4 & p_3 & p_2 & p_1 \\ 0 & p_4 & 0 & p_2 \\ 0 & 0 & p_3 & 0 \\ 0 & 0 & p_4 & p_3 \\ 0 & 0 & 0 & p_4 \end{bmatrix} \odot \begin{bmatrix} r_1 & r_1 & r_1 & r_1 \\ r_2 & r_2 & r_2 & r_2 \\ r_3 & r_3 & r_3 & r_3 \\ r_4 & r_4 & r_4 & r_4 \\ r_5 & r_5 & r_5 & r_5 \\ r_6 & r_6 & r_6 & r_6 \\ r_7 & r_7 & r_7 & r_7 \\ r_8 & r_8 & r_8 & r_8 \\ r_9 & r_9 & r_9 & r_9 \end{bmatrix} \right) \quad (41)$$

As set forth above, the transport of light through the system described above and used to create dual/indirect images is linear. Given that the $\mathbb{R}$ and $\mathbb{Q}$ matrices are defined by the geometry of the setup and the irradiance of a laser spot, both constant throughout the creation of the indirect image, by creating two basis sets, $\mathfrak{B}_\mathbb{P}$ and $\mathfrak{B}_\mathbb{D}$ to describe the reflectance matrix, $\mathbb{P}$, and the data matrix, $\mathbb{D}$, respectively, and defined as:

$$\mathfrak{B}_\mathbb{P} = \{\Psi_1, \Psi_2, \Psi_3, \Psi_4\} \quad (42), \text{ and}$$

$$\mathfrak{B}_\mathbb{D} = \{Y_1, Y_2, Y_3, Y_4\} \quad (43),$$

where $$\Psi_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}, \Psi_2 = \begin{bmatrix} 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, \ldots, \Psi_4 = \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 0 & 0 \\ 0 & 0 & 1 & 0 \\ 0 & 0 & 0 & 1 \end{bmatrix}, \text{ and} \quad (44)$$

$$Y_1 = \begin{bmatrix} 1 \\ 0 \\ 0 \\ 0 \end{bmatrix}, Y_2 = \begin{bmatrix} 0 \\ 1 \\ 0 \\ 0 \end{bmatrix}, \ldots, Y_4 = \begin{bmatrix} 0 \\ 0 \\ 0 \\ 1 \end{bmatrix}. \quad (45)$$

Accordingly, equation (41) may be modeled as a linear transform from the object reflectance basis to the data bases formally defined as:

$$\mathfrak{L}(\mathbb{P}, \mathbb{D}) = \{\mathbb{P} : \mathbb{D} \to \mathfrak{T}\} \quad (46)$$

where the linear transform, $\mathfrak{T}$, is formed by applying the Vec ($\otimes$) operator to the data matrix, $\mathbb{D}$, created when the respective object reflectance basis sets are evaluated. For the embodiment illustrated in FIGS. 5-8, $$\mathfrak{T} = [\mathbb{D}[\Psi_1], \mathbb{D}[\Psi_2], \mathbb{D}[\Psi_3], \mathbb{D}[\Psi_4]] \quad (47)$$

which when evaluated becomes $$\mathcal{I} = \begin{bmatrix} q_1 r_1 & q_2 r_2 & q_4 r_4 & q_5 r_5 \\ q_2 r_2 & q_3 r_3 & q_5 r_5 & q_6 r_6 \\ q_4 r_4 & q_5 r_5 & q_7 r_7 & q_8 r_8 \\ q_5 r_5 & q_6 r_6 & q_8 r_8 & q_9 r_9 \end{bmatrix}, \quad (48)$$

which is a block-Hankel, Hankel-block matrix.

Thus, an indirect image may be modeled as the linear transform operating on a column vector represent the object 50 to produce the recorded data:

$$\begin{bmatrix} d_1 \\ d_2 \\ d_3 \\ d_4 \end{bmatrix} = \begin{bmatrix} q_1 r_1 & q_2 r_2 & q_4 r_4 & q_5 r_5 \\ q_2 r_2 & q_3 r_3 & q_5 r_5 & q_6 r_6 \\ q_4 r_4 & q_5 r_5 & q_7 r_7 & q_8 r_8 \\ q_5 r_5 & q_6 r_6 & q_8 r_8 & q_9 r_9 \end{bmatrix} \cdot \begin{bmatrix} \rho_1 \\ \rho_2 \\ \rho_3 \\ \rho_4 \end{bmatrix}. \quad (49)$$

If the BRDF and geometry of the setup are known a priori, then the transform matrix will be known. The transform matrix may then be inverted and when both sides of equation (49) are multiplied from the left by the inverted transform matrix, $\mathfrak{T}^{-1}$, the reflectance matrix, $\mathbb{P}$, may be solved for, which, in-turn, allows for the reconstruction of the object of interest.

However, because the BRDFs and geometry of the embodiment will likely not likely be available in an operational environment, equation (49) must be solved without explicitly knowing the transform matrix, $\mathfrak{T}$. Equation (49) is underspecified, with four equations and thirteen unknowns. Therefore, solving the system of equations directly will not be possible. One alternative to the direct solve may be to solve equation (49) by posing it as an optimization problem and finding the optimum transform matrix and optimum image vector given the constraint that the multiplication of the two matrices results in the data matrix. Alternately, and in other embodiments, the solution may be optimized such that total energy of the system is minimized while still satisfying equation (49). In yet other embodiments, equation (49) may be solved by dividing the data images into equal section, i.e., halves, quadrants, etc., and using each section of the recorded data to form an indirect image. While each of these indirect images will have a unique linear transform, the object remains the same for all of the indirect images. Therefore, solving equation (49) simultaneously for all of the indirect images may yield a unique solution at the intersection of the sets of solutions formed by the individual images.

Figure 9:
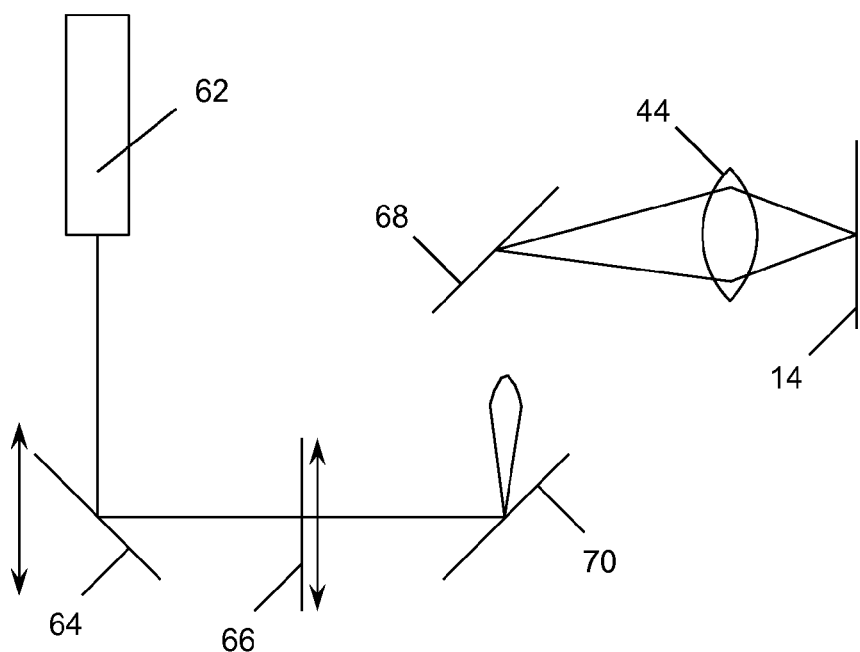
FIG. 9 is a schematic diagram of a dual photography configuration.

In an embodiment used to recover a one-dimensional image as seen in FIG. 9, a 633 nm HeNe laser 62 is used for an illumination source directed via mirror 64 to sinusoidal slides 66 with varying spatial frequencies which is used to apply a $\rho(\bar{x}'-\bar{x})$ dependence to an object to allow a detailed image quality analysis to be completed. An imaged reflector 68 consists of polished aluminum plates that have been spray painted with semi-gloss white paint. An object reflector 70, which provides the $f_{geo}$ dependence, is also a polished aluminum plate with a flat white finish, though either of the imaged reflector or object reflector may be formed of other materials having other finishes. All of the painting was done in a shop environment and imperfections were allowed. A computer-controlled translation stage moved the slide through a path of illumination, $(\bar{x}'-\bar{x})$, for each image.

Figure 10:
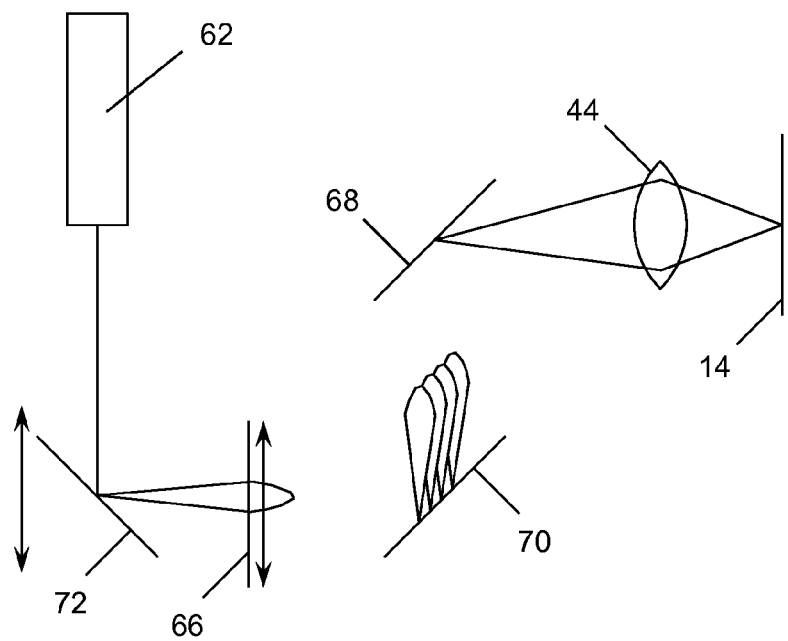
FIG. 10 is a schematic diagram of an indirect photography configuration.

In this embodiment, to complete the dual image, 1,000 digital photographs are acquired with the slide translated horizontally 0.1 mm between each image, though other numbers of photographs and other distances between each image may also be used. A single pass through each slide 66 for this embodiment resulted in a 1-dimension graph rather than a 2-dimension image. This limits the availability to improve the image quality through a blind deconvoltion but does allow for the concept of indirect photography to be validated. To that end, and as seen in the embodiment in FIG. 10, mirror 68 is replaced with a wall reflector 72. In this embodiment the wall reflector 72 may also consist of polished aluminum with a painted flat white finish, although other embodiments may utilize other materials or finishes for the wall reflector 72. Likewise, in other embodiments, the material/finish for any of the wall reflector 72, imaged reflector 68, or object reflector 70 may differ from one another.

To assist in improving a signal-to-noise ratio, the entire image was used to create both the dual and the indirect images. Raw data counts from each of the camera's 16 pixels were summed to form a total irradiance on the lens 44 for each position x' as represented by equations (20) and (30) for the dual and indirect images, respectively.

Figure 11:
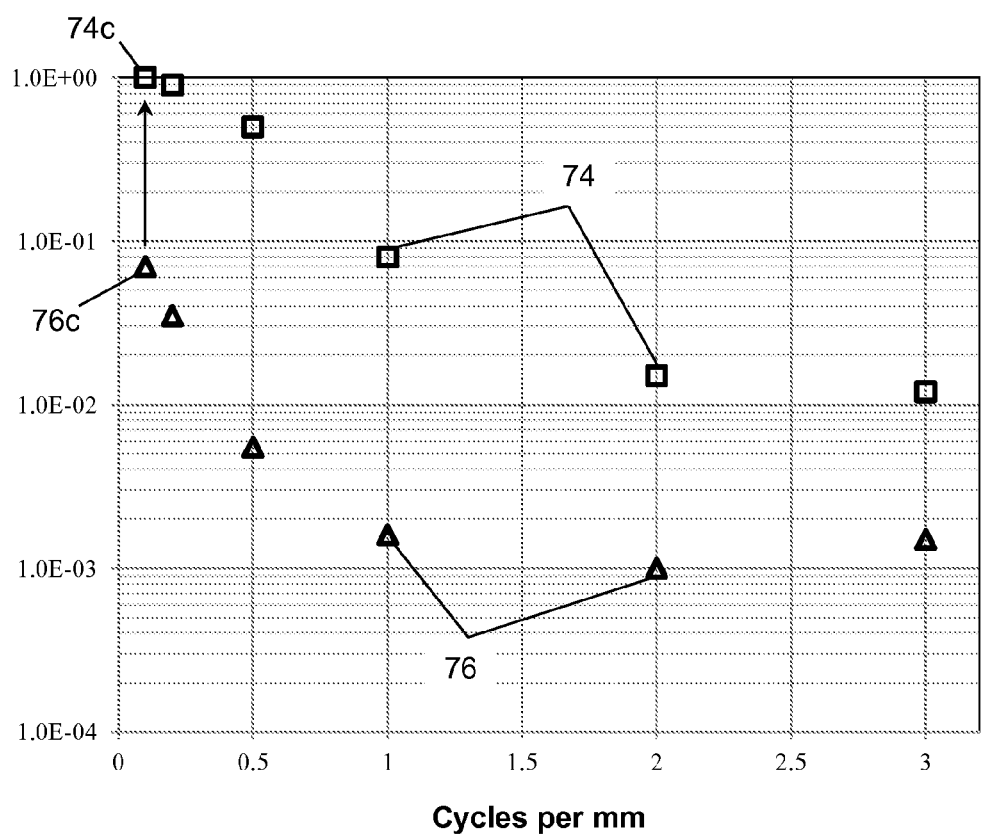
FIG. 11 is a graph representing a Modulation Transfer Function for dual and indirect images.
Figure 11A:
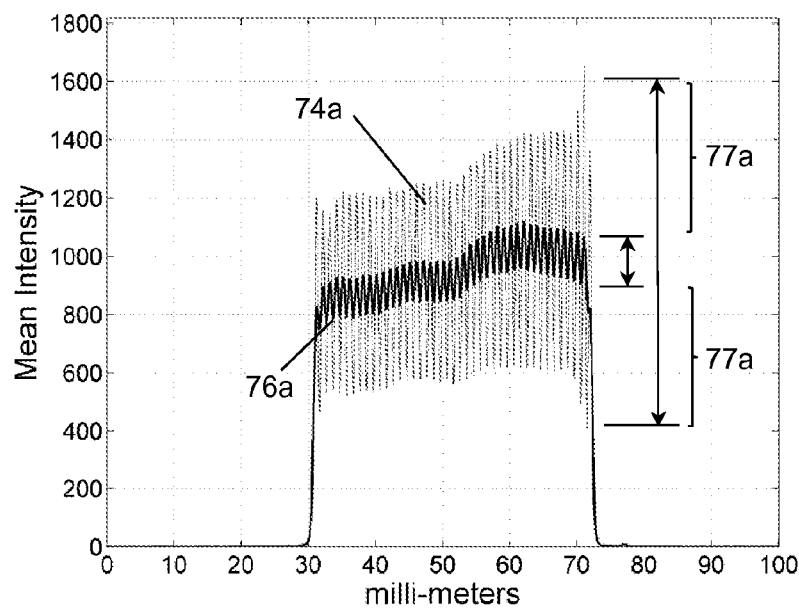
FIG. 11A is a graph representing a Mean Intensity for dual images illustrating an improvement by embodiments of the invention.
Figure 11B:
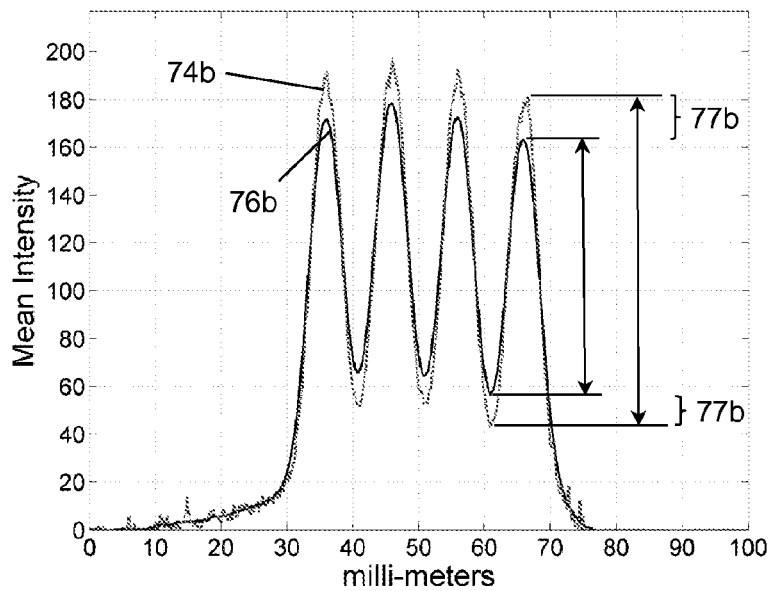
FIG. 11B is a graph representing a Mean Intensity for indirect images illustrating an improvement by embodiments of the invention.

Data was collected for sinusoidal spatial frequencies of 0.1, 0.2, 0.5, 1.0, 2.0, 3.0, and 5.0 cycles per millimeter, though other frequencies may have also been used in other embodiments. After the creation of the dual and indirect images, Fourier analysis was accomplished on each image to assess the amount of energy in the fundamental frequency of the corresponding slide. As equations 20 and 30 suggest, the quality of the perfect image is degraded by a convolution with a point spread function consisting of an initial laser spot irradiance, BRDF's of the various surfaces, and geometries between the surfaces. Therefore, the transfer of information, i.e., spatial frequencies, for both dual and indirect photography is best described by a Modulation Transfer Function (MTF). An example may be seen in FIGS. 11, 11A, and 11B. Specifically, in FIG. 11A illustrating an intensity improvement from a dual image, the improvement 77a may be seen between the raw data 76a and the deconvolved data 74a. Similar improvements 77b for an indirect image may be seen in FIG. 11B. These improvements are summarized in FIG. 11 which is a normalized FFT at the fundamental frequency for multiple sets of data illustrating the improved deconvolved data 74 over the raw data 76.

Figure 12:
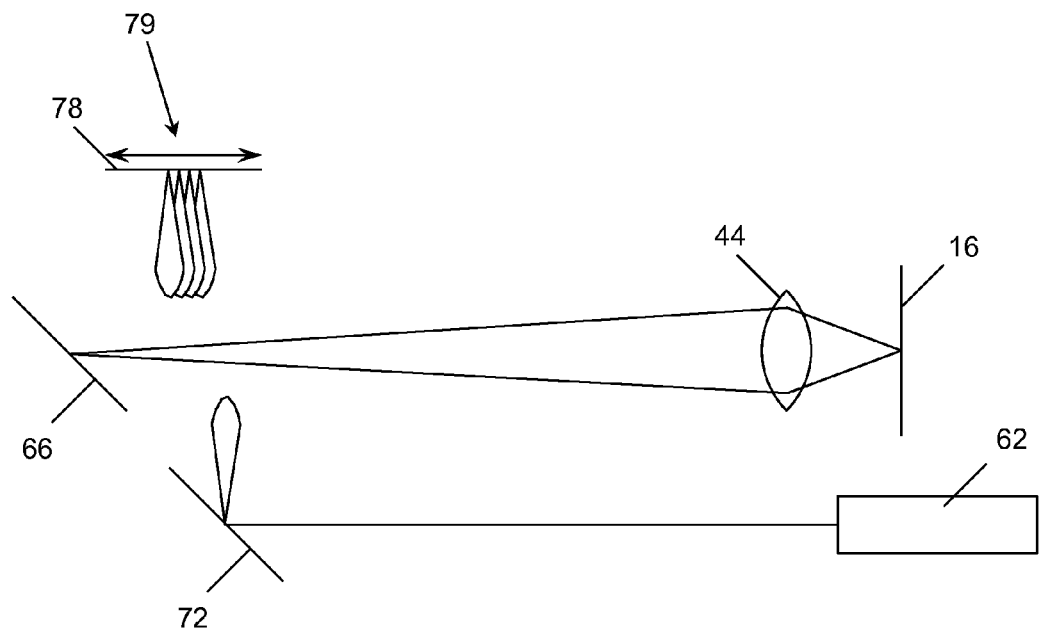
FIG. 12 is a schematic diagram of an alternate indirect photography configuration.

In another embodiment configured to recreate and indirect image, the camera 16 is co-located with the laser 62 as illustrated in the schematic diagram in FIG. 12. While a separated wall reflector 72 was used, it was placed parallel to the imaged reflector 66 to simulate they were part of the same wall, though other embodiment may use other configurations, including using a single wall to represent both the wall reflector 72 and the imaged reflector 66.

Figure 13:
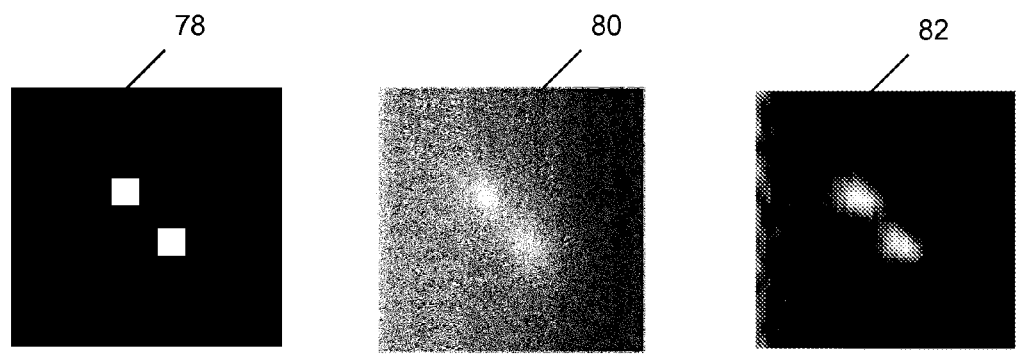
FIG. 13 illustrates an object in the indirect photography configuration of FIG. 12 and its indirect images.
Figure 14:
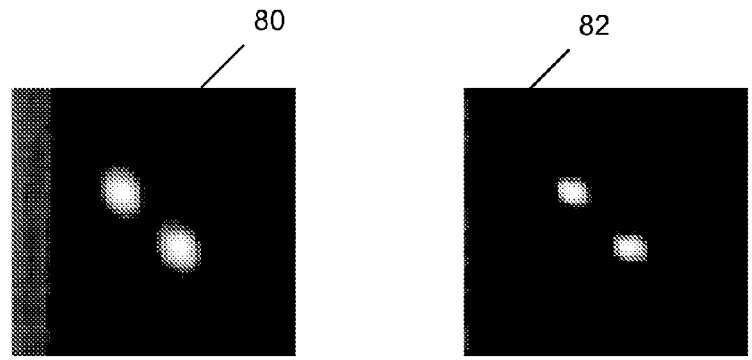
FIG. 14 illustrates improved indirect images of the object in FIG. 13.

An object 78 illustrated in FIG. 13 was used in this embodiment. An indirect image 80 that was produced by the embodiment is also shown in FIG. 13 along with a deconvolved image 82. The indirect image 80 exhibits a banding on the left half of the image which carries over to the deconvolved image 82. In this embodiment, the banding was primarily caused by the translation stage 79. As the object 78 was translated to the left, black cardstock 81 covered a corner of the translation stage 79 and prevented reflections from the translation stage 79 from being imaged by the camera 16 off the imaged reflector. To assist in reducing the banding, the translation stage 79 was covered, resulting in the improved indirect image 80 and deconvolved image 82 shown in FIG. 14.

Figure 15:
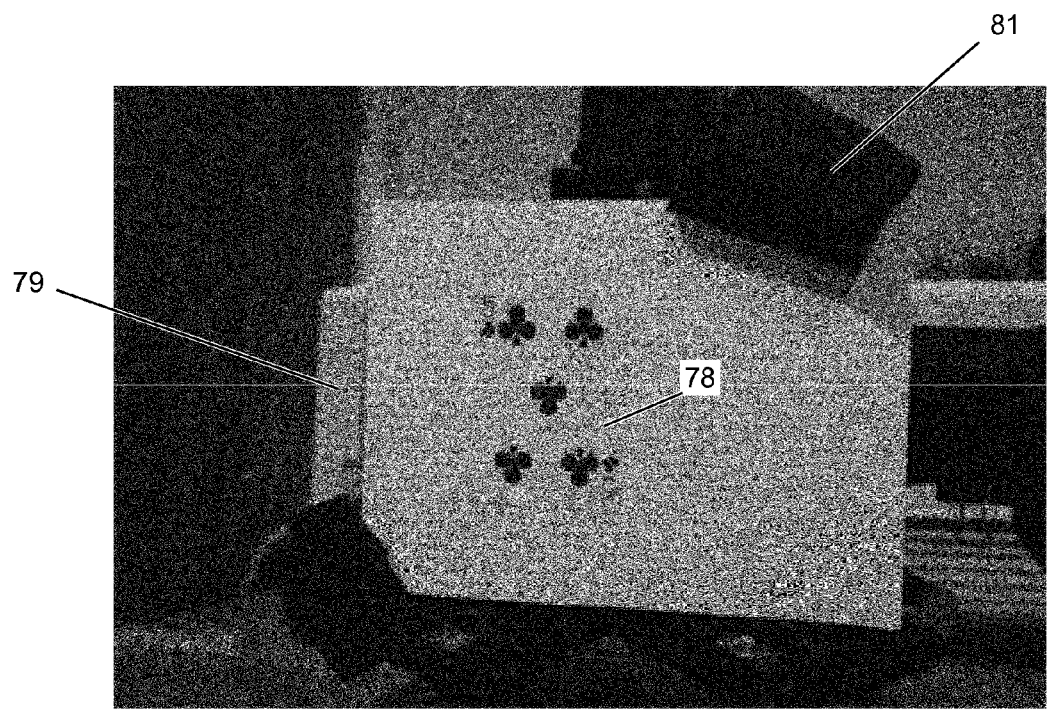
FIG. 15 illustrates an indirect illumination of a playing card being used as an object in the indirect photography configuration of FIG. 12.
Figure 16:
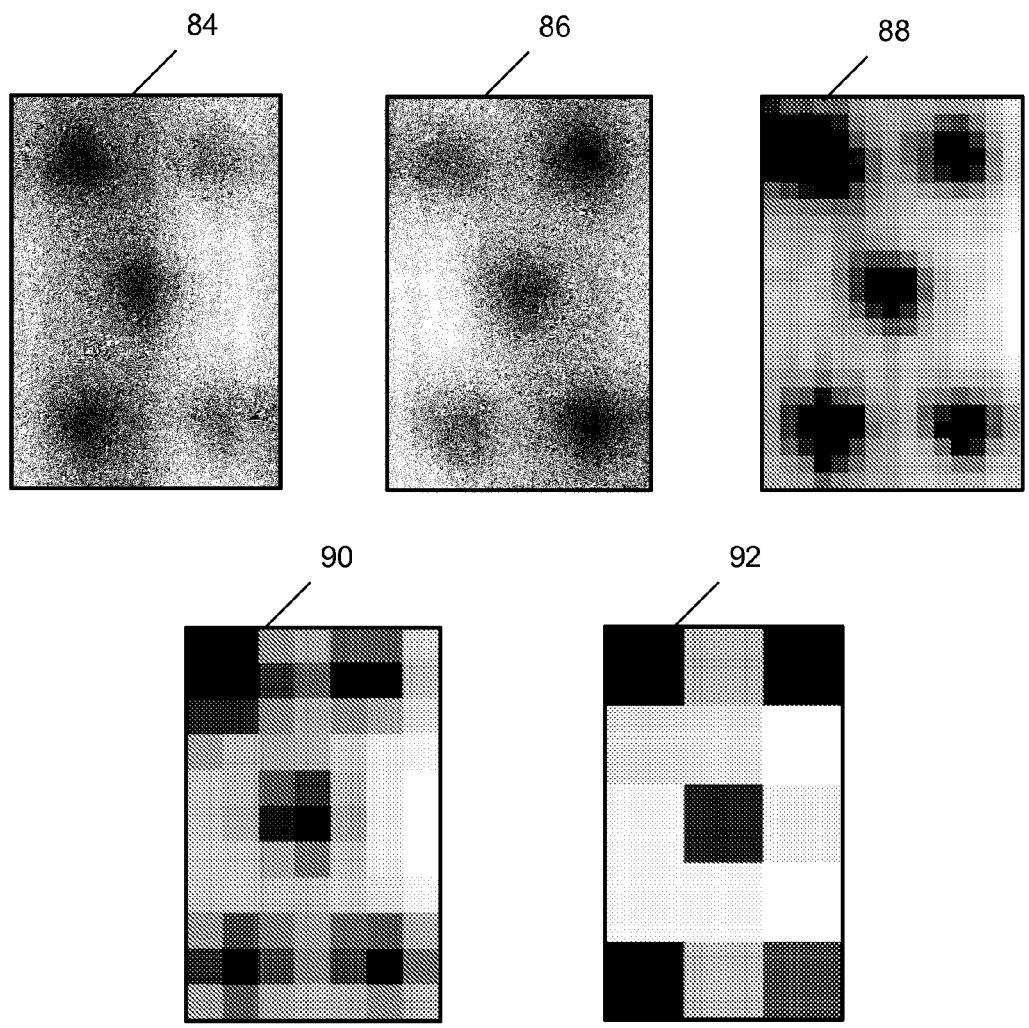
FIG. 16 illustrates the indirect image of the playing card of FIG. 15 at several different resolutions.

In an alternate embodiment, the configuration of the previous embodiment illustrated in FIG. 12 was utilized, but the objects were changed to playing cards. For example, FIG. 15 shows the indirect illumination of the five of clubs in this embodiment. Raw indirect images of the five of clubs were created at five different resolutions, including: 96×63 (84), 47×31 (86), 23×15 (88), 11×7 (90) and 5×3 (92), the results of which are illustrated in FIG. 16.

Figure 18:
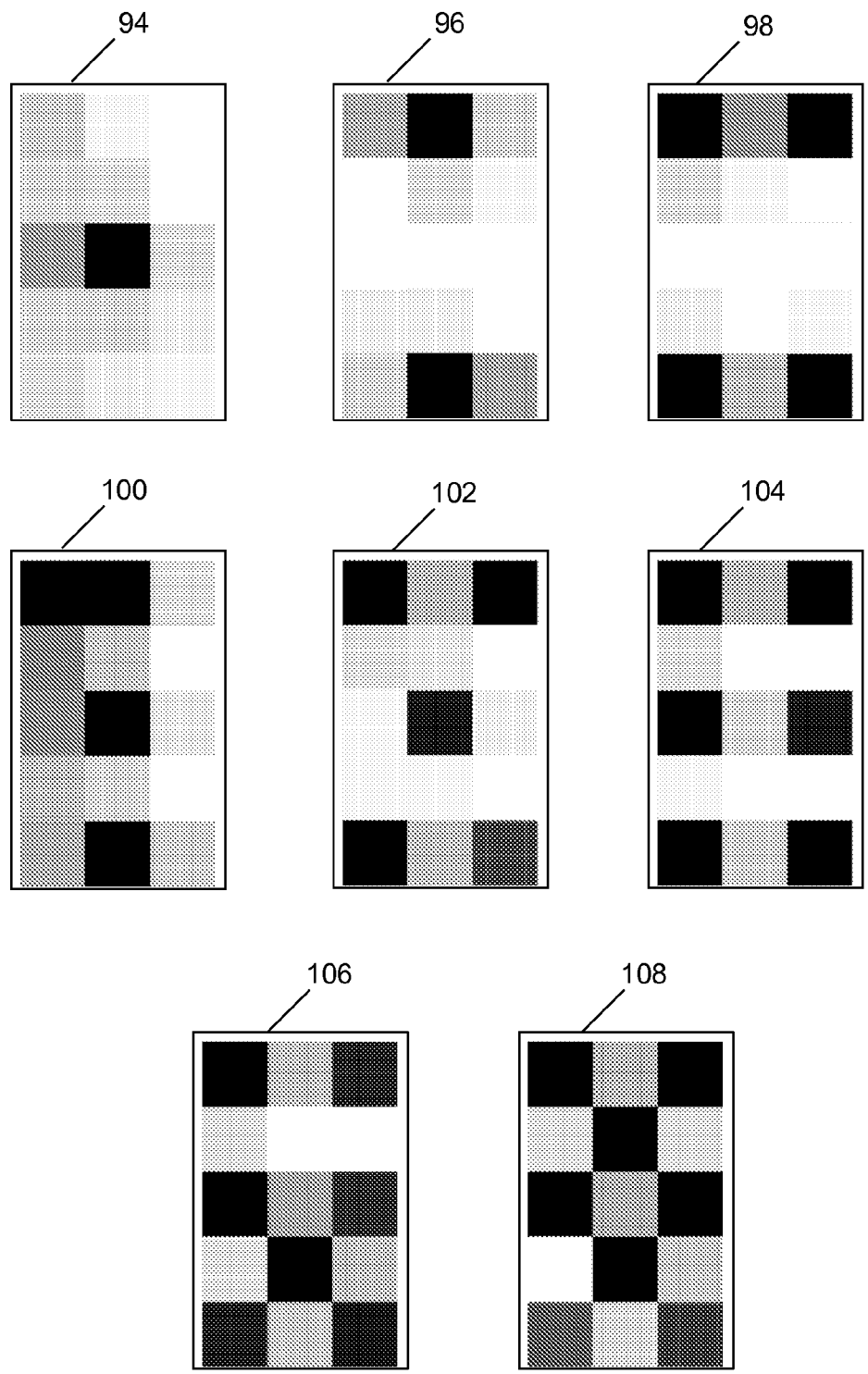
FIG. 18 illustrates a series of indirect images generated by the configuration of FIG. 12 for several different playing cards.

A function of this particular embodiment is to identify the value of the playing card, i.e., ace through king, but not necessarily the suit. To that end, the image quality of the 11×7 (90) and 5×3 (92) indirect images may be computed for recognition of the cards ace through eight. (Note: The 7 is the only card that is not horizontally symmetric; therefore, whether the pip is in the upper or lower position must be tested and reported, i.e., 7U and 7L). The resultant image qualities are reported in the table in FIG. 17. Image quality of the indirect images should improve as the step size to feature size increases. However, because the process of creating indirect images may be both data and time intensive, using the lowest resolution possible will assist in increasing the operational utility of an indirect imaging system. Additionally, because the five of clubs was correctly identified using the 5×3 indirect image, the indirect images of the ace of clubs through the eight of clubs 94-108 will also be created with a 5×3 resolution as illustrated in FIG. 18 for this embodiment. It should be understood that other embodiments may resolutions other than those set forth above, and those embodiments may vary the resolution for each indirect image acquired. Following the creation of the indirect images, the image quality of each image was calculated for each of the possible cards. The highest image qualities for each indirect image are identified in bold in the table in FIG. 19. For every indirect image 94-108, the correct playing card was identified in this embodiment.

Figure 21:
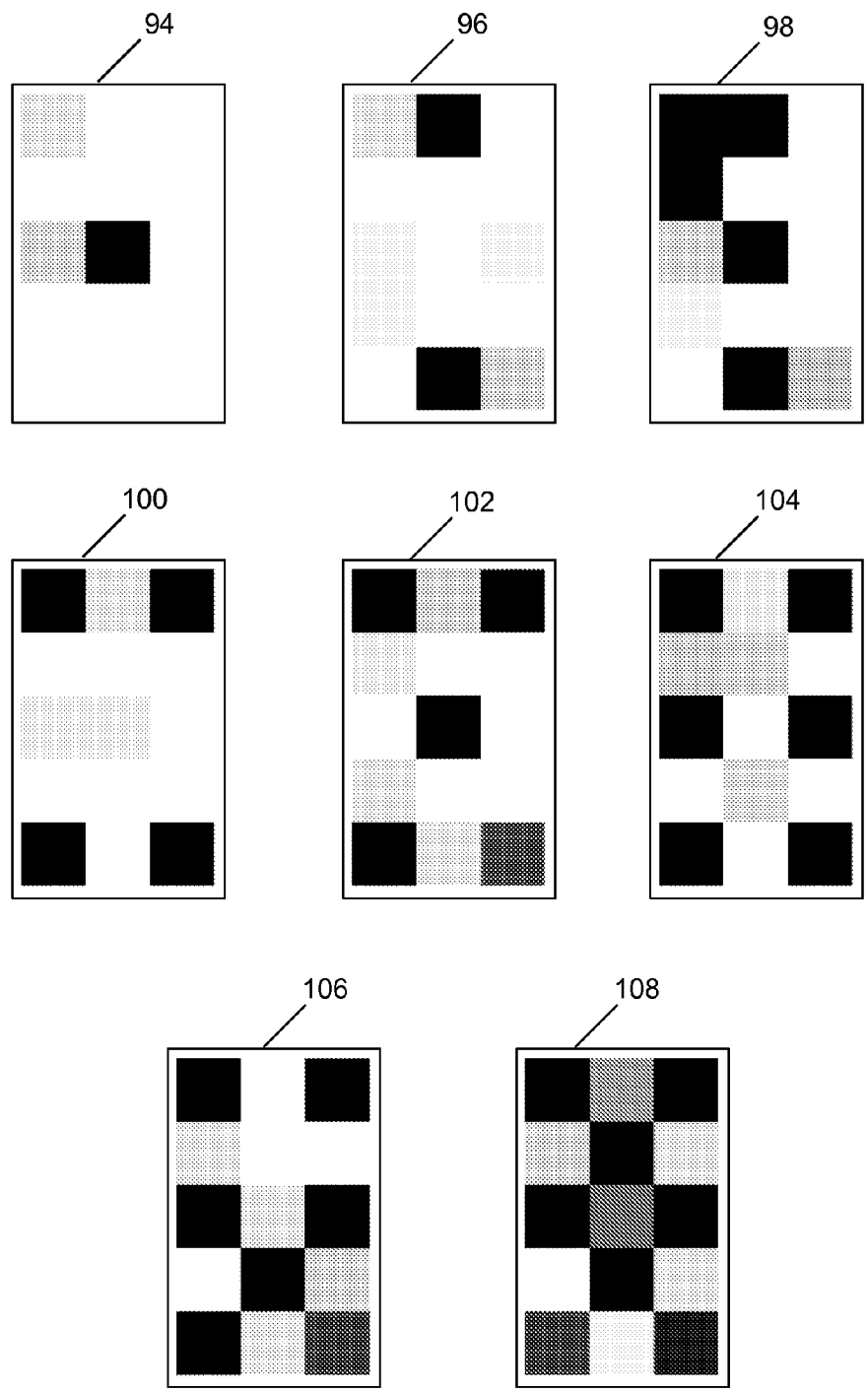
FIG. 21 illustrates an improved image quality of the series of indirect images of FIG. 18.

Following the identification of each card, the image quality of each indirect image 94-108 was improved using a blind deconvolution algorithm such as that available in the MATLAB® solver provided by The MathWorks, Inc. of Natick, Mass., although any type of a mathematical solver with deconvolution algorithm may be used. The table in FIG. 20 lists the image quality improvement for each card following 100 iterations of the deconvolution algorithm and FIG. 21 shows the improved indirect images 94-108.

The exemplary embodiments set out above illustrated that the image quality of indirect images may be improved though a deconvolution process. While standard deconvolution techniques did assist in increasing the image quality, the symmetry of the dual/indirect photography process may allow for further improvement of the image quality as also set out above. Furthermore, where deconvolution is not possible, optimization techniques may be employed.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus for creating an indirect image of an object, the apparatus comprising:
   a light source; and
   an imaging system,
   wherein light emitted from the light source is reflected by a first non-specular surface toward the object,
   wherein light reflected by the object is further reflected by a second non-specular surface toward the imaging system,
   wherein the imaging system is configured to create the indirect image from the reflected light, and
   wherein the imaging system is further configured to improve image quality of the indirect image with a blind deconvolution process.

2. The apparatus of claim 1, wherein the imaging system includes a camera.

3. The apparatus of claim 2, wherein the camera is a digital camera.

4. The apparatus of claim 1, wherein the image quality is improved with an optimization process.

5. The apparatus of claim 1, wherein the light source is a laser.

6. The apparatus of claim 1, wherein the light source and the imaging system are co-located.

7. The apparatus of claim 1, wherein the first and second non-specular surfaces have the same surface finish.

8. The apparatus of claim 1, wherein the first and second non-specular surfaces have a different surface finish.

9. The apparatus of claim 1, wherein the first and second non-specular surface are the same surface.

10. The apparatus of claim 1, wherein neither the light source nor the imaging system is in a direct line of sight of the object.

11. A method of creating an indirect image of an object, the method comprising:
   emitting light from a light source;
   reflecting the emitted light toward the object by a first non-specular surface;
   reflecting light reflected by the object toward an imaging system by a second non-specular surface;
   receiving the reflected light by the imaging system;
   creating the indirect image from the reflected light; and
   improving image quality of the indirect image by a blind deconvolution process.

12. The method of claim 11, further comprising:
   improving image quality of the indirect image by an optimization process.

13. The method of claim 11, wherein the first and second non-specular surfaces have the same surface finish.

14. The method of claim 11, wherein the first and second non-specular surfaces have a different surface finish.

15. The method of claim 11, wherein the first and second non-specular surface are the same surface.

16. The method of claim 11, wherein neither the light source nor the imaging system is in a direct line of sight of the object.

* * * * *